United States Patent
Provenzano et al.

(10) Patent No.: US 8,376,171 B2
(45) Date of Patent: Feb. 19, 2013

(54) METHOD AND SYSTEM OF A DETACHABLE NOSE FACEPLATE

(75) Inventors: Charles J. Provenzano, Houston, TX (US); Michael Leung, Missouri City, TX (US)

(73) Assignee: Electronic Custom Distributors, Inc., Houston, TX (US)

( * ) Notice: Subject to any disclaimer, the term of this patent is extended or adjusted under 35 U.S.C. 154(b) by 839 days.

(21) Appl. No.: 12/553,240

(22) Filed: Sep. 3, 2009

(65) Prior Publication Data

US 2009/0321448 A1   Dec. 31, 2009

Related U.S. Application Data

(63) Continuation-in-part of application No. 11/550,028, filed on Oct. 17, 2006, now Pat. No. 7,654,405.

(51) Int. Cl.
| | |
|---|---|
| *H02G 3/14* | (2006.01) |
| *H02G 3/08* | (2006.01) |
| *B65D 45/16* | (2006.01) |
| *B65D 41/16* | (2006.01) |
| *F16L 5/00* | (2006.01) |
| *H01B 17/26* | (2006.01) |
| *H01B 17/30* | (2006.01) |
| *H01R 9/16* | (2006.01) |

(52) U.S. Cl. ........ 220/242; 220/241; 220/324; 220/786; 220/3.3; 220/3.7; 248/56; 174/66; 174/67; 174/151; 174/153 R

(58) Field of Classification Search .................. 220/241, 220/242, 324, 786, 3.3, 3.7; 248/56; 174/66, 174/67, 151, 153 R
See application file for complete search history.

(56) References Cited

U.S. PATENT DOCUMENTS

| | | | |
|---|---|---|---|
| 2,716,225 A | | 8/1955 | McCubbin |
| 2,987,690 A | | 6/1961 | Marbais |
| D283,221 S | | 4/1986 | West |
| 4,669,802 A | * | 6/1987 | Schaffer ........................ 439/535 |
| 4,688,747 A | * | 8/1987 | Helmsdorfer et al. .......... 248/56 |
| 4,915,638 A | * | 4/1990 | Domian ........................ 439/142 |
| 5,675,123 A | * | 10/1997 | Proctor et al. ................... 174/58 |
| D502,386 S | | 3/2005 | Provenzano |
| 7,374,454 B1 | * | 5/2008 | Wang ............................ 439/536 |
| 7,390,964 B2 | | 6/2008 | Gorin |
| 7,399,920 B2 | | 7/2008 | Gorin |

OTHER PUBLICATIONS

Office Action dated Jan. 23, 2009 in case U.S. Appl. No. 11/550,028.
Office Action dated Apr. 7, 2009 in case U.S. Appl. No. 11/550,208.
Office Action dated Aug. 7, 2009 in case U.S. Appl. No. 11/550,028.

* cited by examiner

*Primary Examiner* — Anthony Stashick
*Assistant Examiner* — Andrew T Kirsch
(74) *Attorney, Agent, or Firm* — Conley Rose, P.C.; Mark E. Scott

(57) ABSTRACT

Detachable nose faceplate. At least some of the illustrative embodiments are systems including: a faceplate that defines a front side, a back side and a nose aperture, the faceplate configured to removably attach to a surface; a nose portion that defines a top side, a bottom side, a nose edge and a lip that outlines a portion of the bottom side; and a passage defined between the faceplate and the nose edge. The nose portion is both: configured to couple to the faceplate in a first configuration in which the nose portion protrudes through the nose aperture in the direction of the front side of the faceplate and the lip abuts the back side of the faceplate; and configured to couple to the faceplate in a second configuration in which the nose portion protrudes in the direction of the back side of the faceplate and the lip abuts the back side of the faceplate.

12 Claims, 7 Drawing Sheets

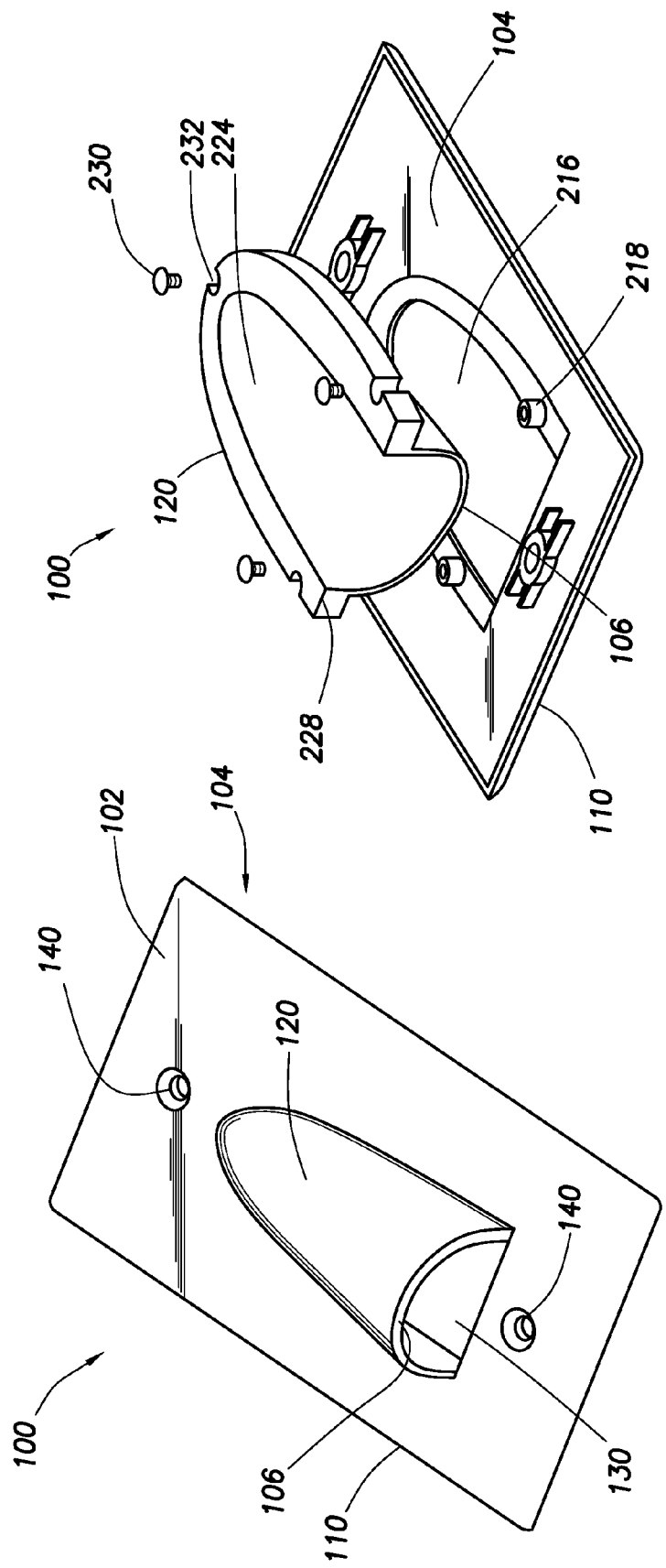

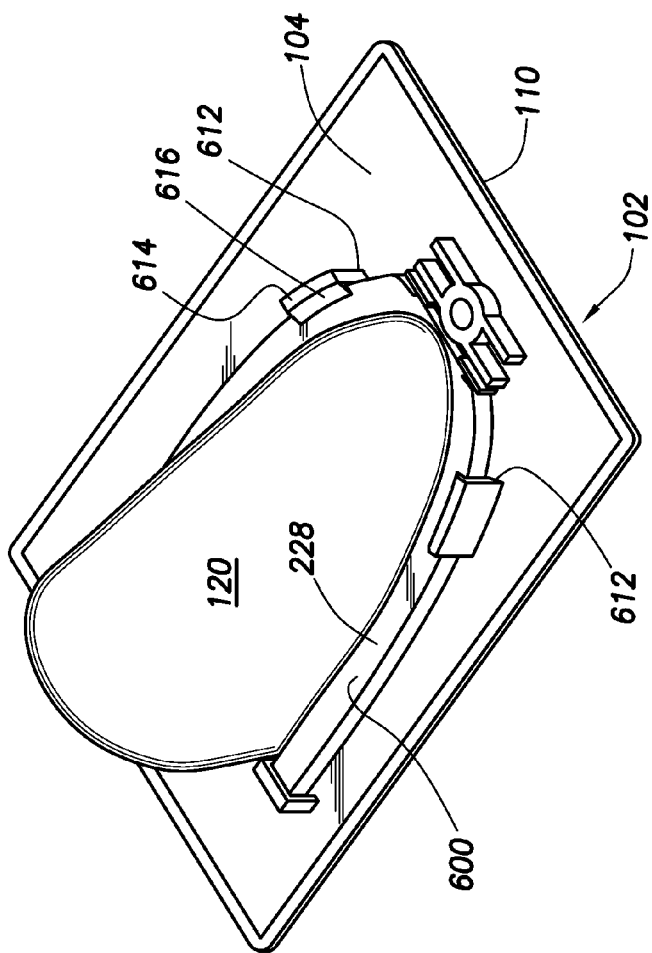
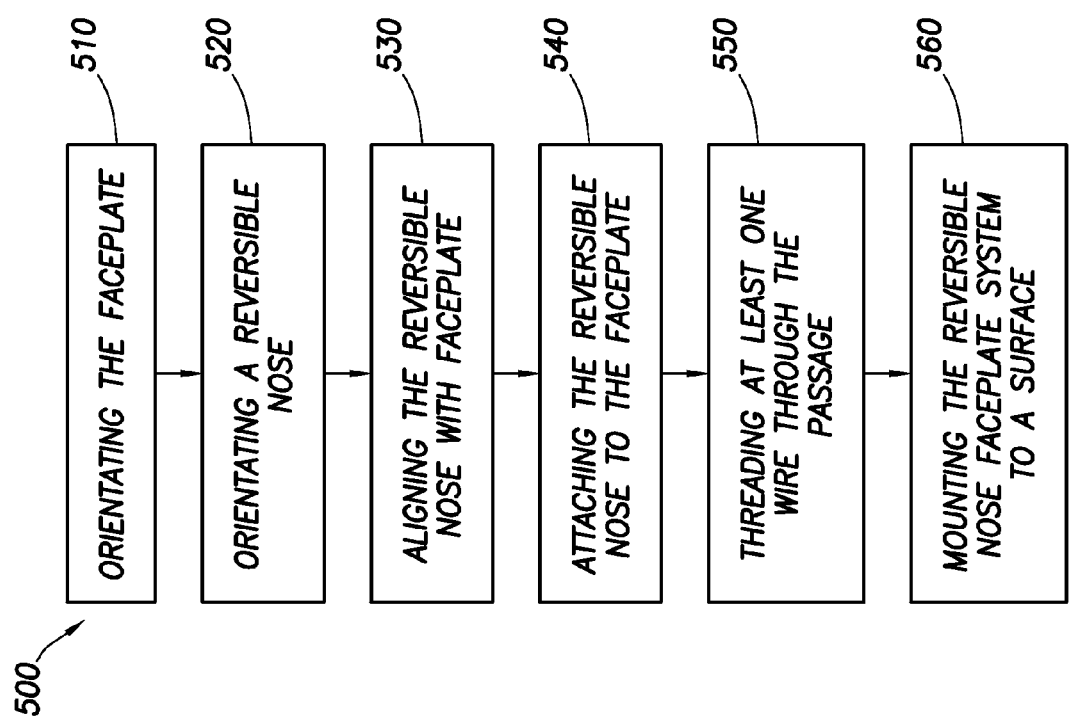

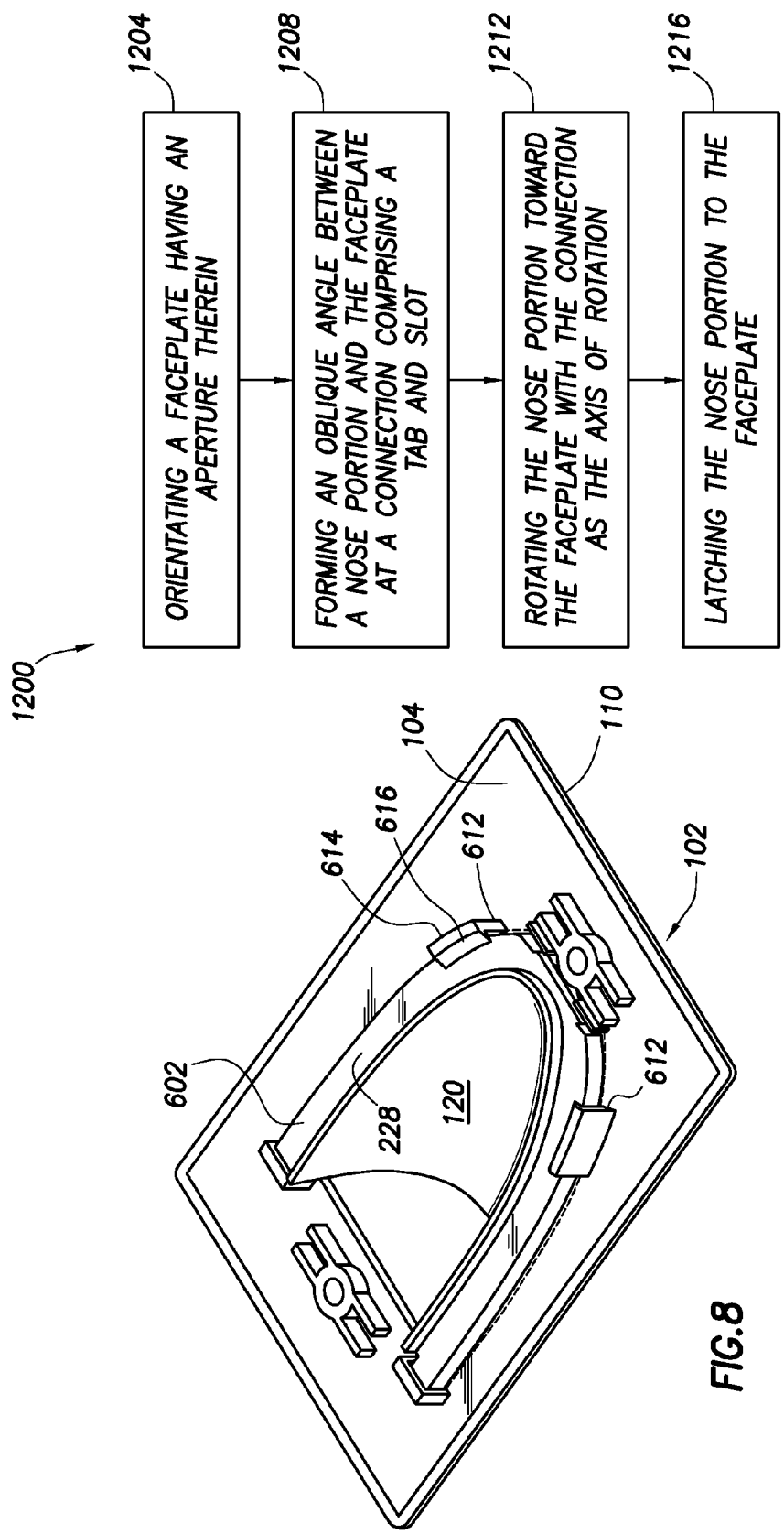

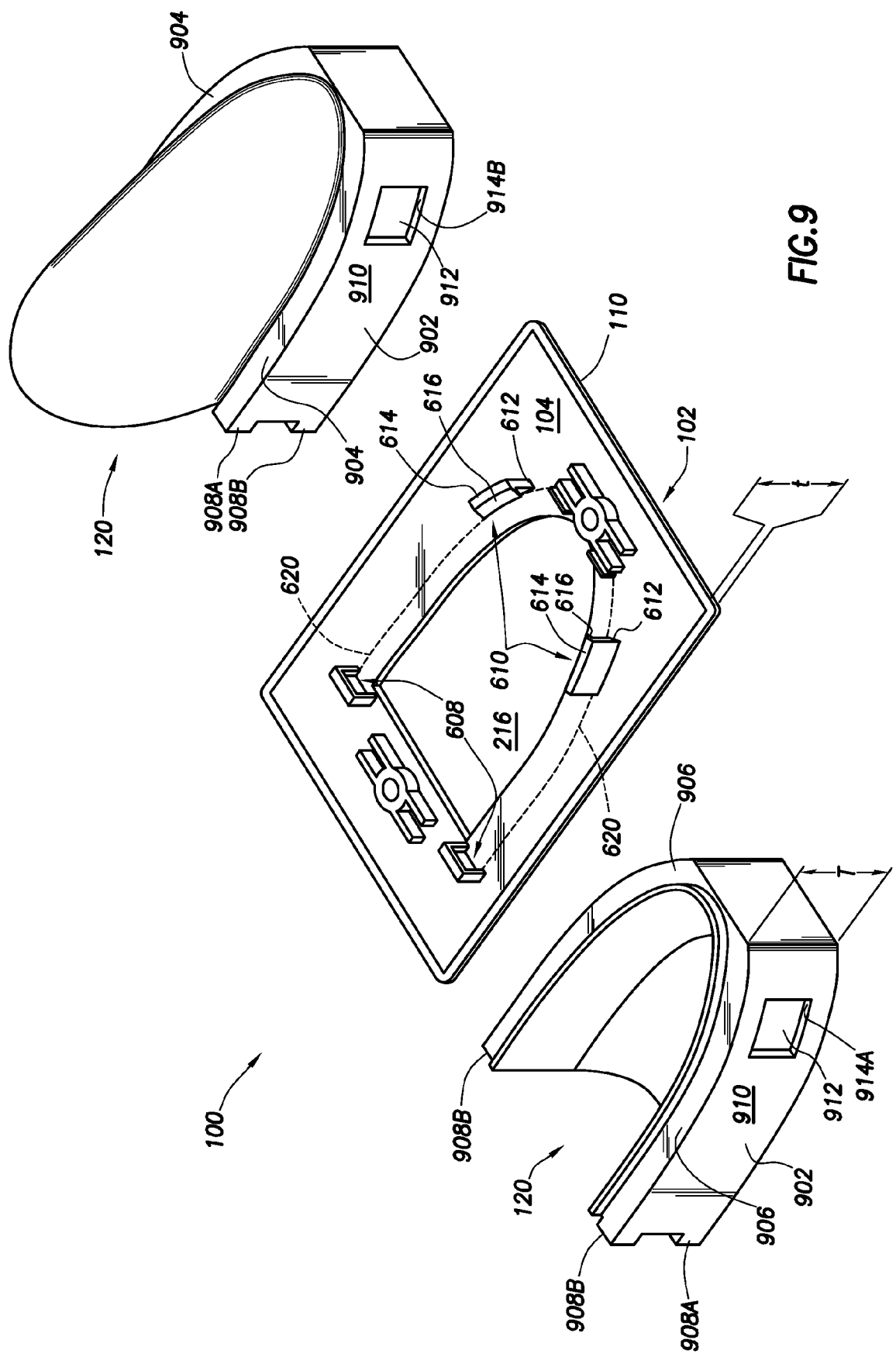

METHOD AND SYSTEM OF A DETACHABLE NOSE FACEPLATE

CROSS-REFERENCE TO RELATED APPLICATIONS

This application is a continuation-in-part of commonly assigned U.S. application Ser. No. 11/550,028 filed Oct. 17, 2006, titled "Method and system of a detachable nose faceplate", now U.S. Pat. No. 7,654,405, which is incorporated by reference herein as if reproduced in full below.

BACKGROUND

Embedding electrical and audio visual wire and cables within a wall is a practice of installers. To get the wiring or cabling into the wall a hole must be cut in the sheetrock. The hole creates an eye sore which installers cover with faceplates. Faceplates are manufactured in various shapes, sizes, and colors, with each faceplate molded into a single configuration. Frequently, installers have an installation project where they need to cover the hole in the wall while still enabling the wire or cables to pass through. This limitation requires installers to keep in stock single configuration faceplate inventory so that the proper faceplate will be on hand, which inventory requirement is inconvenient and incurs additionally cost for the installer.

BRIEF DESCRIPTION OF THE DRAWINGS

For a detailed description of exemplary embodiments, reference will now be made to the accompanying drawings in which:

FIG. 1 illustrates a top view of a detachable nose faceplate system;

FIG. 2 illustrates an expanded bottom view of the detachable nose faceplate system;

FIG. 5 illustrates a method for a detachable nose faceplate system;

FIG. 7 illustrates a perspective back view of a faceplate system with the nose portion protruding in the direction of the back side of the faceplate;

FIG. 8 illustrates a perspective back view of a faceplate system with the nose portion protruding in the direction of the front side of the faceplate;

FIG. 9 illustrates alternative embodiments of attaching the nose portion to the face plate;

FIG. 12 illustrates a method for a detachable nose faceplate system.

NOTATION AND NOMENCLATURE

Figure 4:
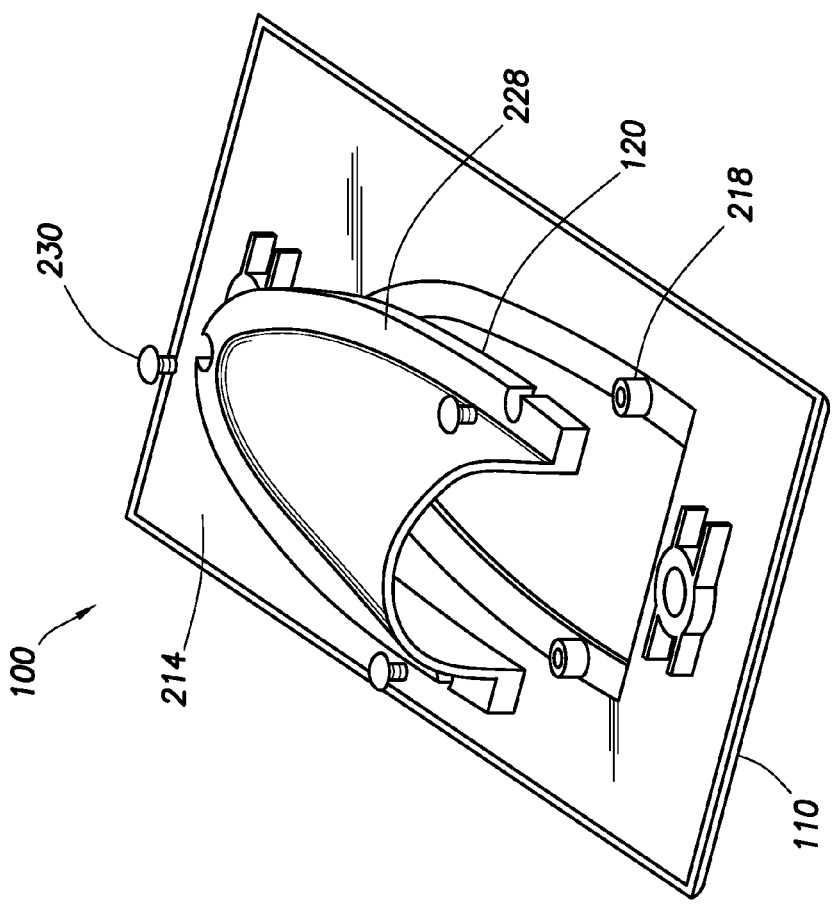
FIG. 4 illustrates an expanded bottom view of the detachable nose faceplate system with the nose reversed.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect electrical connection via other devices and connections.

DETAILED DESCRIPTION

When reading this section which describes exemplary embodiments, one should keep in mind several points. First, the following exemplary embodiments are what the inventors believe to be the best mode for practicing the invention at the time this patent was filed. Thus, since one of ordinary skill in the art may recognize from the following exemplary embodiments that substantially equivalent structures or substantially equivalent acts may be used to achieve the same results in exactly the same way, or to achieve the same results in a not dissimilar way, the following exemplary embodiments should not be interpreted as limiting the scope of just the embodiments described.

Second, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (e.g., one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense.

Accordingly, the various embodiments can be characterized as detachable nose faceplate system, method and device. One embodiment is a system that has a faceplate with a removable nose portion that may be orientated in a plurality of configurations. Another embodiment is a method for orientating a detachable nose portion in a nose faceplate system. Yet another embodiment is a device that has a faceplate with a removable nose portion that may be orientated in a plurality of configurations each forming a passage enabling at least one wire to pass through.

FIG. 1, illustrates a top view of a detachable nose faceplate system 100. The detachable nose faceplate system 100 comprises a faceplate 110 that removably attaches to a surface by way of at least one fastener. The faceplate 110 has or defines a front side 102 and a back side 104, and a nose aperture. A nose portion 120 has or defines a front or top side, a back or bottom side, and a nose edge 106. The nose portion 120 attaches to the faceplate 110, and at least one passage 130 is formed between the faceplate 110 aperture and the nose edge 106. In some embodiments, the faceplate 110 and nose portion 120 are made out of plastic and are identical in color. However, the faceplate 110 and nose portion 120 may be equivalently made in various shapes and sizes and made of various materials (e.g., alloy, wood, metal, plastic, urethane, or polyurethane). Furthermore, the faceplate 110 and nose portion 120 may each be made in various colors (e.g. black, white or beige). In some embodiments, the faceplate 110 removably attaches to a flat surface, such as a wall, pillar, entertainment center, office desk, or other piece of furniture. Alternatively, the faceplate 110 removably attaches to a rounded surface (e.g., a pole, cylindrical column, or cylindrical pillar).

In some embodiments, the faceplate 110 secures to a wall, or electrical box within the wall through apertures 140 by a fastener, such as a screw. In alternative embodiments, the faceplate 110 may be secured to a wall or other surface by way of a bracket, clip, clamp, Velcro, double stick tape or other equivalent mechanisms.

Passage 130 is formed proximate to the intersection of the base most portion of the faceplate aperture and base most portion of the nose edge 106. In some embodiments, the passage 130 is semi-circular and substantially flute-like. In alternative embodiments, more than one passage 130 may be implemented in order to separate selected wires or cables that may pass through the passage 130. Examples of wires and cables that may pass through the passage 130 are audio cable, video cable, power cable, and network cable.

FIG. 2 illustrates an expanded bottom view of the faceplate system 100 in accordance with some embodiments. In the particular embodiment shown in FIG. 2, the detachable nose faceplate system 100 comprises the faceplate 110 having a back side 104, a nose aperture 216, and at least one socket 218. Each socket 218 couples to the back side 104, is integrally formed within the bottom side 104 of the faceplate 110, and protrudes in the direction of the back side 104. The nose portion 120 further comprises a bottom side 224, a lip 228 and at least one fastener 230. In some embodiments, the lip 228 outlines a portion of the bottom side 224 along the perimeter, and which lip 228 removably attaches to at least one socket 218, such as by fastener 230. In particular, each fastener 230 couples to a socket 218 and holds the lip 228 in an abutting relationship against the back side 104 of the faceplate 110. Each fastener 230 may be a screw; however, in an alternative embodiment clips, brackets, clamps, or other fasteners may be equivalently used. Furthermore, the lip 228 may have pre-formed foramens 232 to assist aligning the nose portion 120 to the faceplate 110 and its respective sockets 218.

In some embodiments, the nose portion 120 may be configured to protrude from the faceplate 110 in a plurality of configurations. For example, the nose portion 120 may be configured to protrude in the direction of the front side 102 of the faceplate 110 (as in FIG. 1), and in which orientation the lip 228 abuts the back side 104 and where the nose portion 120 protrudes through the aperture 216. In another configurations, the nose portion 120 protrudes in the direction of the back side 104 of the faceplate 110 (as in FIG. 3 below), and in which configuration the lip portion 228 abuts the back side 104 of the faceplate 110. In other embodiments the nose portion 120 may be flipped, rotated, turned, angled, or manipulated into a plurality of configurations. For example, in some embodiments the nose portion 120 and corresponding nose aperture 216 may be more symmetrical in shape whereby when removably attached to the faceplate 210 may yield four configurations. The nose aperture 216 in particular embodiments is arch-shaped.

Figure 3:
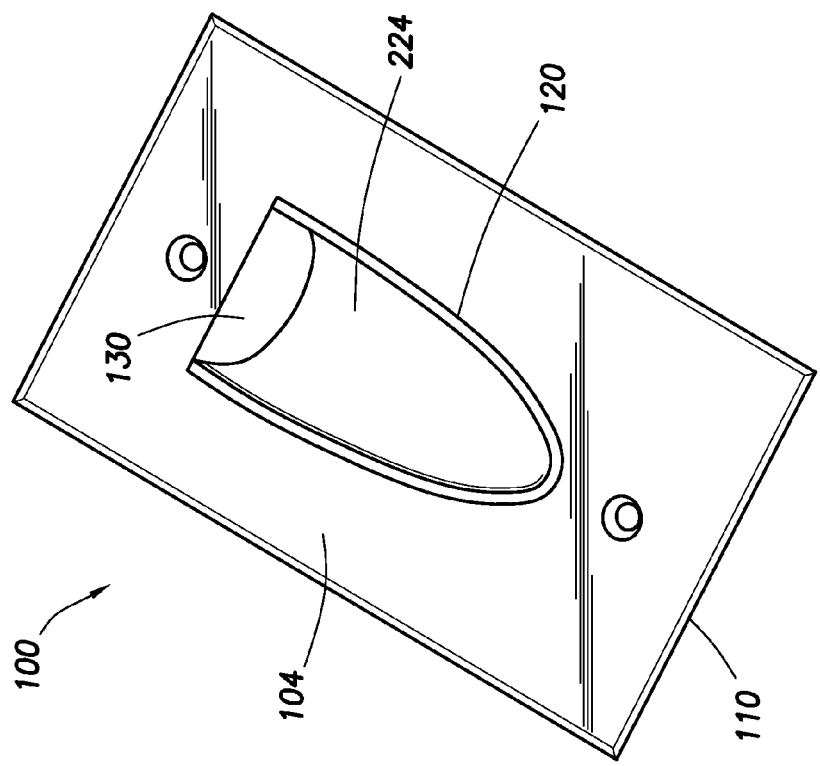
FIG. 3 illustrates a top view of a detachable nose faceplate system with the nose reversed.

FIG. 3 illustrates a top view of a detachable nose faceplate system 100 in which the nose portion 120 is protruding in a direction of the back side 104 of the faceplate 110. In this configuration the nose bottom-side 224 is aligned with the faceplate front side 102 and the passage 130 is behind the faceplate 110. The opposite configuration is illustrated in FIG. 1 whereby the nose portion 120 protrudes in the direction of the front side 102 of the face plate 110.

FIG. 4 illustrates an expanded bottom view of a detachable nose faceplate system 100 with the nose portion 120 protruding in the direction of the back side 104 of the faceplate 110. Similar to FIG. 2, the nose portion 120 by way of its lip 228 in a reversed configuration, removably attaches to the faceplate 110 by each socket 218 and a series of fasteners 230.

FIG. 5 illustrates a method for a detachable nose faceplate system. While the illustrative method of FIG. 5 shows a particular order, the various steps may be equivalently combined, separated, or performed in a different order. The method 500 comprises orientating a faceplate 110 (block 510) having a nose aperture 216, orientating a nose portion 120 (block 520) in one of a plurality of possible orientations, aligning the nose portion 120 with the faceplate 110 (block 530), attaching the nose portion 120 to the faceplate 110 (block 540), threading wire (block 550), and mounting the faceplate 110 to a surface (block 560).

In some embodiments, orientating the nose portion (block 520) is the orienting such that the nose portion 120 protrudes in the direction of the front side 102 of the face plate 110. In other embodiments, orientating the nose portion 120 is orienting such that nose portion 120 protrudes in the direction of the back side 104 of the faceplate 110. Thus, orientating the nose portion 120 (block 520) comprises selecting one of multiple nose portion 120 configurations. As illustrated in the first four figures, the nose portion 120 has two possible configurations; however, multiple nose configurations may be used to accomplish the intended functions and methods.

Aligning the nose portion 120 and the faceplate 110 (block 530) in a particular embodiment comprises aligning a portion of the lip 228 of the nose portion 120 with at least one socket 218 of the faceplate 110. Attaching the nose portion 120 to the faceplate 110 (block 540) in a particular embodiment comprises removably attaching the lip 228 and at least one socket 218 securely together by way of a fastener 230. In some embodiments, the attaching of the nose portion 120 to the faceplate 110 (block 540) comprises removably attaching the lip 228 to three different sockets 218 integrally formed within the faceplate 110 using three fasteners 230.

Threading wire (block 550) comprises threading one or more wires, such as audio, video, or power cables, through the passage 130. In alternative embodiments, the wire may be threaded through the aperture 216 prior to attaching the nose portion 120 to the faceplate 110. These alternative embodiments may be beneficial when the wires or cables have connectors that are too large to fit through the passage 130. The wires may collectively originate from within the wall, are threaded through the passage 130, and are routed to their respective audio and video components. Alternatively, a network cable, for example, may originate from a personal computer, is threaded through the passage 130, and finally routed to a network access point. Lastly, mounting the reversible nose faceplate system 100 (block 560) comprises mounting the reversible nose faceplate system 100 to a surface by way of at least one fastener. In some embodiments, the detachable nose faceplate system 100 is mounted to a wall via two screws. Alternatively, the reversible nose faceplate system 100 may be mounted to a desk.

Figure 6:
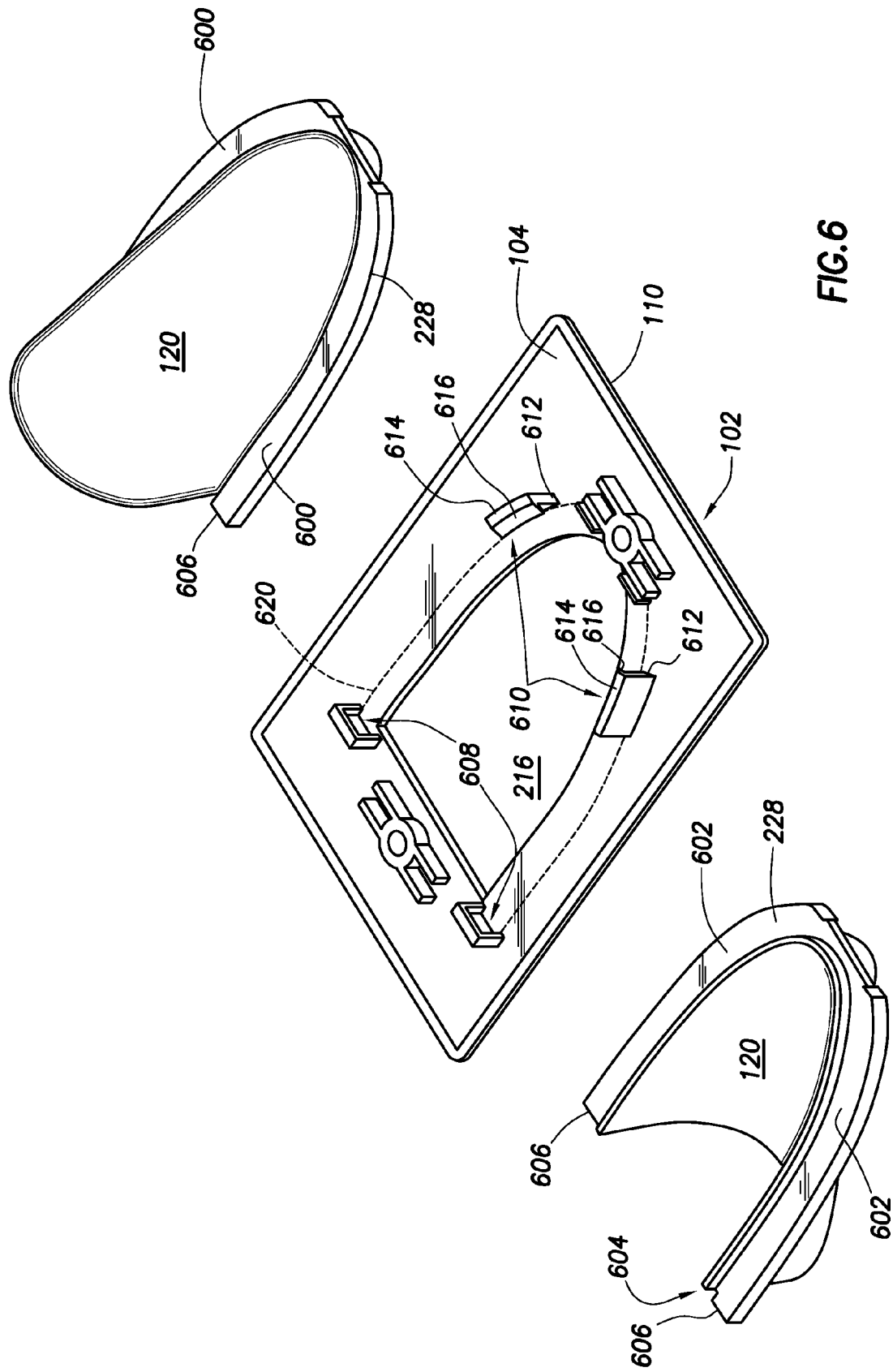
FIG. 6 illustrates alternative embodiments of attaching the nose portion to the face plate.

FIG. 6 illustrates alternative embodiments of a faceplate system 100 where the nose portion 120 (multiple views of the nose portion 120 shown in FIG. 6) couples to the faceplate 110 by fasteners being a snap system. In particular, the nose portion 110 comprises flange or lip 228. The lip 228 has a first surface 600 and a second surface 602. Each surface 600 and 602 defines a plane, and in a particular embodiment the planes defined by the surfaces 600 and 602 are parallel. Either by slight extension of the lip 228, or by way of notches 604, the lip 228 defines tabs 606.

Likewise in the illustrative embodiments of FIG. 6, the back side 104 of the faceplate 110 defines a plurality of features. In particular, the embodiments illustrated by FIG. 6 comprise slot members 608 coupled to the back side 104 of the faceplate 110, with the slot members 608 protruding in the direction of the back side 104 of the faceplate 110. Further, the embodiments illustrated by FIG. 6 comprise a plurality of latch members 610. Each latch member has a proximal end 612 coupled to the back side 104 of the faceplate, and each latch member 610 has a distal end 614 that defines a catch portion 616.

Regardless of the configuration in which the nose portion 120 couples to the faceplate 110 (e.g., protruding in the direction of the front side 102 of the faceplate, or protruding in the direction of the back side 104 of the faceplate), coupling of the nose portion 120 involves placing the tabs 606 in the slots 608 with the lip 228 forming an oblique angle with the back side 104 of the face plate. The nose portion 120 is then rotated, with the tabs 606 within their respective slots 608 forming an axis of rotation, until the catch portions 616 of latch members 610 couple over respective portions of the lip 228. For example, when the nose portion 120 couples to the faceplate 110 and protrudes in the direction of the back side 104 of the faceplate, the catch portions 616 couple to surface 600 of lip 228. Likewise, when the nose portion 120 couples to the faceplate 110 and protrudes in the direction of the front side 102 of the faceplate, the catch portions 616 couple to surface 602 of lip 228.

Still referring to FIG. 6, when the nose portion 120 is coupled to the faceplate 110, the lip 228 abuts the back side 104 of the faceplate 110. In particular, when the nose portion 120 couples to the faceplate 110 and protrudes in the direction of the back side 104 of the faceplate, the surface 602 of the lip 228 abuts the back side 104 of the faceplate in the area delineated by the dashed line 620 and the aperture 216. FIG. 7 illustrates the nose portion 120 coupled to the faceplate 110 and protruding in the direction of the back side 104 of the faceplate 110, and with the lip 228 abutting the back side 104. Likewise, when the nose portion 120 couples to the faceplate 110 and protrudes in the direction of the front side 102 of the faceplate 110, the surface 600 of the lip 228 abuts the back side 104 of the faceplate in the area delineated by the dashed line 620 and the aperture 216. FIG. 8 illustrates the nose portion 120 coupled to the faceplate 110 and protruding in the direction of the front side 102 of the faceplate 110, and with the lip 228 abutting the back side 104.

FIG. 9 illustrates yet still further embodiments of a faceplate system 100 where the nose portion 120 (multiple views of the nose portion 120 shown in FIG. 9) couples to the faceplate 110 by fasteners being a snap system. In particular, the nose portion 120 comprises flange or lip 902. The lip 902 has a first surface 904 and a second surface 906. Each surface 904 and 906 defines a plane, and in a particular embodiment the planes defined by the surfaces 904 and 906 are parallel. In the particular embodiments of FIG. 9, the lip 902 defines an extended sidewall 910 that defines thickness "T". The thickness T of the lip 902 in these embodiments is greater than a thickness "t" of the faceplate 110. In some embodiments the thickness T is 0.5 inches or more, and in a particular embodiment the thickness T is 0.75 inches.

When the nose portion 120 protrudes in the direction of the back side 104 of the faceplate 110, the thickness T of the lip 902 enables the nose portion 120 to extend further into the wall such that the thickness of the wall board material does not unduly limit how much of the aperture created by the nose portion 120 and faceplate 110 may be utilized for wires, and the like.

The nose portion 120 of FIG. 9 defines a plurality of tabs 908. The tabs 908 operate in similar fashion to the previous embodiments, except that only one set of tabs 908 is used for each orientation of the nose portion 120. In particular, when the nose portion 120 is coupled to the faceplate 110 such that the nose portion protrudes in the direction of the front side 102, tabs 908A couple within the slot members 608 coupled to the back side 104 of the faceplate 110. Conversely, when the nose portion 120 is coupled to the faceplate 110 such that the nose portion 120 protrudes in the direction of the back side 104, tabs 908B couple within the slot members 608 coupled to the back side 104 of the faceplate 110.

The sidewall 910 of the lip 228 further defines a plurality of cavities 912. The cavities 912 themselves define sidewalls 914, which sidewalls 914 define planes that are substantially parallel to the planes defined by the surfaces 904 and 902. When the nose portion 120 is coupled to the faceplate 110 such that the nose portion protrudes in the direction of the front side 102, the catch portion 616 abuts the sidewall 914A within the cavity 912. When the nose portion 120 is coupled to the faceplate 110 such that the nose portion protrudes in the direction of the back side 104, the catch portion 616 abuts the sidewall 914B within the cavity 912.

Similar to the embodiments of FIG. 6, the faceplate 110 comprises latch members 610. Each latch member has a proximal end 612 coupled to the back side 104 of the faceplate, and each latch member 610 has a distal end 614 that defines a catch portion 616. Regardless of the configuration in which the nose portion 120 couples to the faceplate 110 (e.g., protruding in the direction of the front side 102 of the faceplate, or protruding in the direction of the back side 104 of the faceplate), coupling of the nose portion 120 involves placing the tabs 908 in the slots 608 with the lip 902 forming an oblique angle with the back side 104 of the face plate. The nose portion 120 is then rotated, with the tabs 908 and within their respective slots 608 forming an axis of rotation, until the catch portions 616 of latch members 610 couple over the lip 902. While in some embodiments the latch members 610 may be long enough to couple over the most distant surface 904, 906, in the embodiments illustrated the latch member 610 couple within the cavities 912, and more particularly couple to the to the sidewalls 914 within the cavities 912.

Still referring to FIG. 9, when the nose portion 120 is coupled to the faceplate 110, the lip 902 abuts the back side 104 of the faceplate 110. In particular, when the nose portion 120 couples to the faceplate 110 and protrudes in the direction of the back side 104 of the faceplate, the surface 906 of the lip 902 abuts the back side 104 of the faceplate in the area delineated by the dashed line 620 and the aperture 216. Likewise, when the nose portion 120 couples to the faceplate 110 and protrudes in the direction of the front side 102 of the faceplate 110, the surface 904 of the lip 902 abuts the back side 104 of the faceplate in the area delineated by the dashed line 620 and the aperture 216.

Figure 10:
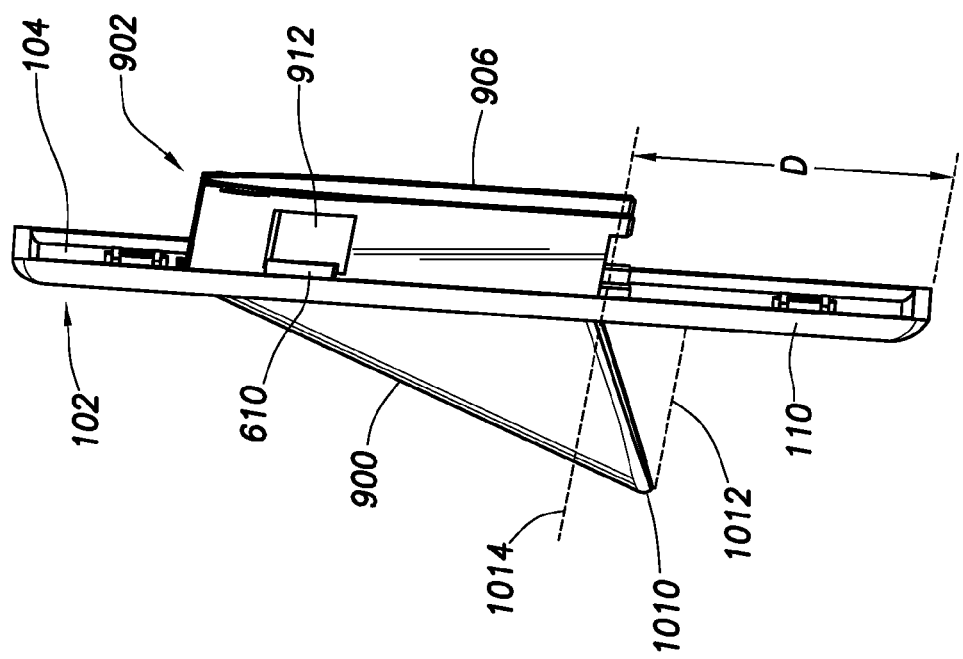
FIG. 10 illustrates a perspective side view of a faceplate system with the nose portion protruding in the direction of the front side of the faceplate.

FIG. 10 shows a side perspective view of the nose portion 120 coupled to the faceplate 110, and the nose portion 120 protruding in the direction of the front side 102 of the face plate 110. Much like the previous embodiments, the lip 902 abuts the back side 104 when the nose portion 120 protrudes in the direction of the front side 102 of the faceplate 110. Moreover, FIG. 10 shows the latch member 610 coupled within cavity 912.

Figure 11:
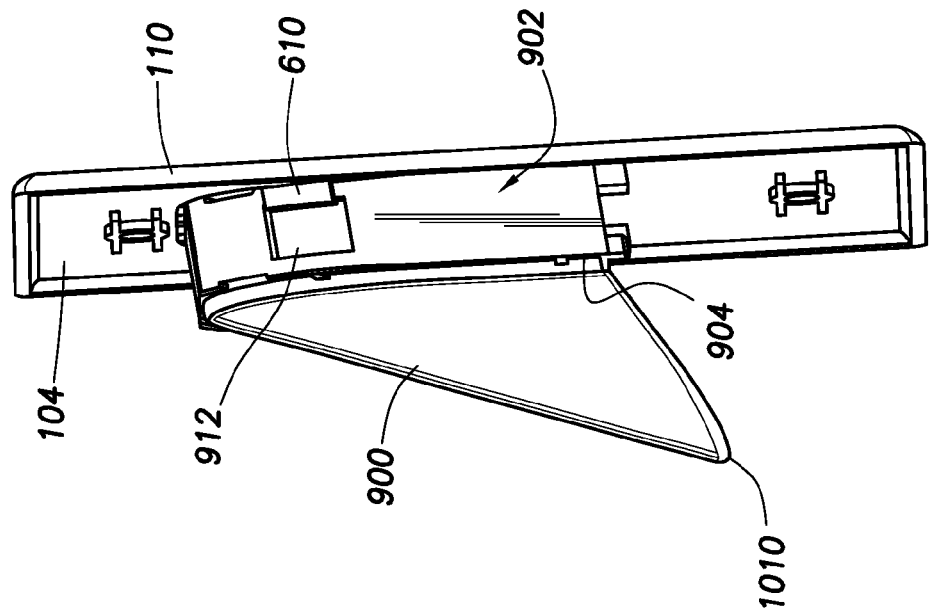
FIG. 11 illustrates a perspective side view of a faceplate system with the nose portion protruding in the direction of the back side of the faceplate.

FIG. 11 shows a side perspective view of the nose portion 120 coupled to the faceplate 110, and the nose portion 120 protruding in the direction of the back side 104 of the face plate 110. Much like the previous embodiments, the lip 902 abuts the back side 104 when the nose portion 120 protrudes in the direction of the back side 104 of the faceplate 110. Moreover, FIG. 11 shows the latch member 610 coupled within cavity 912. Moreover, considering FIGS. 10 and 11 together, it is seen that when the nose portion 120 is coupled to the faceplate and protruding in the direction of the front side 102 of the faceplate, the extended thickness of the lip 902 protrudes in the direction of the back side 104 of the faceplate 110. Thus, the distance the nose portion 120 protrudes, as measured from the back side 104 of the faceplate 110, is effectively the distance from the surface 904 (FIG. 9) to the nose tip 1010. However, when the nose portion 120 is coupled to the faceplate and protruding in the direction of the back side 104 of the faceplate, the extended thickness of the lip 902 again protrudes in the direction of the back side 104 of the faceplate 110, thus extending the distance of the nose tip 1010 to the back side 104 by the thickness T. Thus, the distance the nose portion 120 protrudes, as measured from the back side 104 of the faceplate 110, is effectively the distance from the surface 906 to the nose tip 1010.

FIGS. 10 and 11 also show optional features. For example, the distance "D" from the bottom of the faceplate 110 to the aperture is longer than illustrated in previous embodiments. While in some embodiments the distance D may be 0.75 inches, in other embodiments the distance D may be between 1.5 inches and 2.0 inches. While the area defined by apertures in the faceplate 110 may be smaller when the distance D is longer, more space will exist between the nose tip 1010 and an electrical box installed in the wall (not shown), thus increasing the maneuverability of the wiring in the aperture. Moreover, the nose tip 1010 is extended when compared to the nose portions 120 of the previous embodiments. In particular, as illustrated in FIGS. 10 and 11, the nose tip 1010 (disposed opposite the lip 902) if projected into the plane defined by the lip 902 (the projection illustrated by dashed line 1012) is beyond an area defined by the lip 902 (the bottom most portion of the area defined by the lip 902 shown by dashed line 1014). It is noted, however, that the extended distance D between the bottom of the faceplate and the aperture need not be used with the extended length nose tip 1010.

FIG. 12 shows a method 1200 in accordance with further embodiments. In particular, the illustrative method involves orientating a faceplate having an aperture therein (block 1204). Next, the illustrative method involves forming an oblique angle between a nose portion and the faceplate at a connection comprising a tab and slot (block 1208). The forming may be with the nose portion oriented to protrude in the direction of the front side of the faceplate, or the forming may be with the nose portion oriented to protrude in the direction of the back side of the faceplate. Regardless of the intended orientation, the nose portion is rotated toward the faceplate with the connection as the axis of rotation (block 1212). As the nose portion is rotated, the nose portion latches to the faceplate (block 1216).

The above discussion is meant to be illustrative of the principles and various embodiments of the reversible nose faceplate system 100. Numerous variations and modifications will become apparent to those skilled in the art once the above disclosure is fully appreciated. For example, the nose portion 120 may be a single piece of molded plastic or may be formed from multiple pieces of molded plastic that may snap or fit together having the same intended form or function. Further, while the various embodiments that utilize the latch member are also illustrated with a tab and slot arrangement, the tab and slot arrangement may be omitted and additional latch members used. Moreover, the tab and slot members need not be at the base of the nose aperture, particularly when the aperture in the nose plate is square or rectangular. It is intended that the following claims be interpreted to embrace all such variations and modifications.

What is claimed is:

1. A faceplate system comprising:
 a faceplate that defines a front side, a back side and a nose aperture, the faceplate configured to removably attach to a surface;
 a nose portion that defines a top side, a bottom side, a nose edge and a lip that outlines a portion of the bottom side, the nose portion:
  configured to couple to the faceplate in a first configuration in which the nose portion protrudes through the nose aperture in the direction of the front side of the faceplate and the lip abuts the back side of the faceplate; and
  configured to couple to the faceplate in a second configuration in which the nose portion protrudes in the direction of the back side of the faceplate and the lip abuts the back side of the faceplate; and
 a passage defined between the faceplate and the nose edge.

2. The faceplate system of claim 1 further comprising:
 a socket coupled to the back side of the faceplate that protrudes in the direction of the back side of the face plate;
 a fastener that couples to the socket, and wherein the fastener holds the lip in the abutting relationship when the nose portion is in the first configuration, and the fastener holds the lip in the abutting relationship when the nose is in the second configuration.

3. The faceplate system of claim 1 further comprising:
 a latch that has a proximal end coupled to the back side of the faceplate, and the latch has a distal end that defines a catch portion, the latch protrudes in the direction of the back side of the faceplate; and
 the catch portion of the latch couples over the lip in first configuration, and the catch portion of the latch couples over the lip in second configuration.

4. The faceplate system of claim 1 further comprising:
 a slot member coupled to the back side of the faceplate, and the slot member protrudes in the direction of the back side of the faceplate; and
 a tab member coupled to the nose portion;
 the tab member fits within the slot when the nose portion is in the first configuration, and the tab member fits within the slot when the nose portion is in the second configuration.

5. The faceplate system of claim 4 further comprising:
 a latch that has a proximal end coupled to the back side of the faceplate, and the latch has a distal end that defines a catch portion, the latch protrudes in the direction of the back side of the faceplate; and
 the catch portion of the latch couples over the lip in first configuration, and the catch portion of the latch couples over the lip in second configuration.

6. The faceplate system of claim 1 further comprising:
 a latch that has a proximal end coupled to the back side of the faceplate, and the latch has a distal end that defines a catch portion, the latch protrudes in the direction of the back side of the faceplate;
 a cavity portion on a sidewall of the lip; and
 the catch portion of the latch couples to the cavity portion of the lip in the first configuration, and the catch portion of the latch couples to the cavity portion of the lip in the second configuration.

7. The faceplate system of claim 6 wherein the lip defines a lip thickness greater than a thickness of the faceplate, the nose portion protrudes a first distance measured from the back of the faceplate in the first configuration, and the nose portion protrudes a second distance measured from the back of the faceplate in the second configuration, and wherein the second distance is greater than the first distance by the lip thickness.

8. The faceplate system of claim 7 wherein the lip thickness is 0.5 inches or greater.

9. The faceplate system of claim 1 wherein the nose portion further comprises a nose tip disposed opposite the nose portion from the lip, and wherein a position of the nose tip projected into a plane defined by lip is beyond an area defined by the lip.

10. The faceplate system of claim 1 whereby the nose portion is a single piece of molded plastic.

11. The faceplate system of claim 1 whereby the nose portion is constructed of multiple pieces of molded plastic.

12. The faceplate system of claim 1 wherein the lip defines a first plane, and the front side of the faceplate defines a second plane, and when the lip abuts the back side of the faceplate the first plane and second plane are parallel.

* * * * *